(12) United States Patent
Wolford

(10) Patent No.: US 9,387,787 B1
(45) Date of Patent: Jul. 12, 2016

(54) PORTABLE STORAGE UNIT FOR STORING FLUID PARTICULATES

(75) Inventor: Glen Michael Wolford, Corinth, TX (US)

(73) Assignee: MCCLINTON ENERGY GROUP, LLC, Odessa, TX (US)

( * ) Notice: Subject to any disclaimer, the term of this patent is extended or adjusted under 35 U.S.C. 154(b) by 97 days.

(21) Appl. No.: 13/595,969

(22) Filed: Aug. 27, 2012

Related U.S. Application Data

(60) Provisional application No. 61/528,123, filed on Aug. 26, 2011.

(51) Int. Cl.
*B60P 1/02* (2006.01)
*B60P 1/00* (2006.01)

(52) U.S. Cl.
CPC .......................................... *B60P 1/00* (2013.01)

(58) Field of Classification Search
CPC ....................................................... B60P 1/00
USPC .......... 414/523, 495, 503, 505, 508, 519, 520
See application file for complete search history.

(56) References Cited

U.S. PATENT DOCUMENTS

| | | | |
|---|---|---|---|
| 5,556,237 A * | 9/1996 | Rexius | 406/32 |
| 7,472,481 B2 * | 1/2009 | Lukac et al. | 29/891 |
| 2010/0098517 A1 * | 4/2010 | Hishiya | H01L 21/67775 414/160 |
| 2011/0174387 A1 * | 7/2011 | Olivier | 137/15.07 |

\* cited by examiner

*Primary Examiner* — Saul Rodriguez
*Assistant Examiner* — Willie Berry, Jr.
(74) *Attorney, Agent, or Firm* — Seyfarth Shaw LLP; Brian Michaelis

(57) ABSTRACT

A portable storage unit for storing fluid, particulates, or combinations thereof, wherein the portable storage unit can have a trailer with a frame. An outer container can be connected to the frame, and can have a first storage cavity with an outlet. A gate can provide for selective opening and closing of the outlet. An inner container can be movably disposed within the outer container, and can have a second storage cavity. The second storage cavity can be in selective fluid communication with the first storage cavity. At least a partial seal can be formed between the inner container and outer container. A hydraulic cylinder can be connected to the inner container and outer container for moving the inner container relative to the outer container, allowing for an adjustable volumetric capacity of the first storage cavity.

15 Claims, 2 Drawing Sheets

PORTABLE STORAGE UNIT FOR STORING FLUID PARTICULATES

CROSS REFERENCE TO RELATED APPLICATIONS

The present application claims priority to and the benefit of U.S. Provisional Patent Application Ser. No. 61/528,123 filed on Aug. 26, 2011, entitled "PORTABLE STORAGE UNIT FOR STORING FLUID PARTICULATES", which is incorporated herein in its entirety.

FIELD

The present embodiments generally relate to a portable storage unit for storing fluid, particulates, or combinations thereof.

BACKGROUND

A need exists for a portable storage unit for storing fluid, particulates, or combinations thereof, that has an inner container movably disposed within an outer container; thereby providing an adjustable volumetric capacity of the outer container.

A further need exists for a portable storage unit that is configured to provide for selective fluid communication between the inner container and outer container.

A further need exists for a portable storage unit having an inner container and outer container configured to contain the same fluid and/or particulates, or different fluid and/or particulates.

A further need exists for a portable storage unit for storing fluid, particulates, or combinations thereof that has a reduced footprint.

The present embodiments meet these needs.

BRIEF DESCRIPTION OF THE DRAWINGS

The detailed description will be better understood in conjunction with the accompanying drawings as follows.

Figure 1:
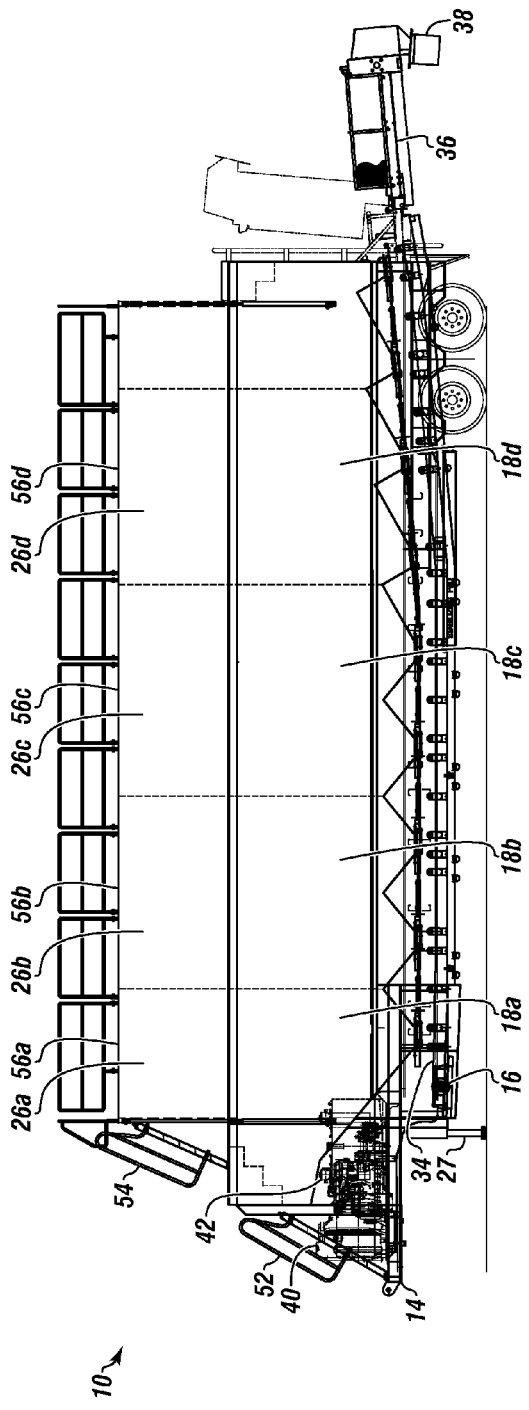
FIG. 1 depicts an embodiment of a portable storage unit on a raised configuration.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments relate to a portable storage unit for storing fluid, particulates, or combinations thereof. For example, the fluid, particulates, or combinations thereof can include sand, gravel, glass beads, plastic beads, dry chemicals, grains, other granular materials, or combinations thereof.

The portable storage unit can include a trailer. The trailer can have wheels supporting a frame, and can be configured to be engaged with a vehicle for transportation of the trailer.

The portable storage unit can include one or more container assemblies.

One or more of the container assemblies can include one or more outer containers. The outer containers can be connected with the frame of the trailer.

The outer container can have a first storage cavity for storing fluid, particulates, or combinations thereof.

The outer container can have an outlet for releasing stored fluid, particulates, or combinations thereof from the outer container. For example, the outlet can have a gate that can operate to selectively open and close the outlet. The gate can be hydraulically operated. The gate can be controlled by one or more flow control hydraulic cylinders.

The container assembly can also include one or more inner containers. The inner container can be movably disposed within the outer container. At least a partial seal can be formed between the inner container and the outer container. For example, a flexible flap or flange can be connected to an inner surface of the outer container for sealingly engaging the inner containers. Also, the flexible flap or flange can be connected to an outer surface of the inner container for sealingly engaging the outer container.

The inner container can have a second storage cavity for storing fluid, particulates, or combinations thereof. The second storage cavity can be in fluid communication with the first storage cavity.

In one or more embodiments, the first storage cavity can be used to store a first type of fluid, particulates, or combinations thereof, while using the second storage cavity to store a second type of fluid, particulates, or combinations thereof. As such, the portable storage unit can be used to simultaneously store more than one type of fluid, particulates, or combinations thereof.

The second storage cavity can be in selective fluid communication with the first storage cavity. For example, the inner container can have an inner container outlet that can be selectively opened or closed with a flow control gate that can be selectively operated to provide fluid communication between the second storage cavity and the first storage cavity. The flow control gate can be a hydraulic operated gate, a pneumatic operated gate, a valve operated gate, or the like.

One or more lifting hydraulic cylinders can be connected with the inner container and outer container. In operation, the lifting hydraulic cylinders can be configured to move the inner container relative to the outer container.

The inner container can be moved relative to the outer container using one or more lifting hydraulic cylinders.

Movement of the inner containers relative to the outer containers can allow adjustment of a volumetric capacity of the portable storage unit. For example, by raising an inner container from an outer container, the volumetric capacity of the first storage cavity of the outer container can be increased, and by lowering the inner container into the outer container the volumetric capacity of the first storage cavity of the outer container can be decreased. As such, the portable storage unit can have a variable modular storage capacity while maintaining a small footprint.

One or more embodiments can include a conveyor connected to the frame and aligned with the outlets of the first storage cavity. An end conveyor can be connected to the frame and aligned with the conveyor. A down spout can be connected to the end conveyor. The end conveyor can be configured to swivel.

In one or more embodiments, one or more outrigger pads can be connected with the trailer for stabilizing and maintaining a position of the trailer.

A hydraulic tank, deck engine, or combinations thereof can be connected to the frame for powering and/or controlling the lifting hydraulic cylinders, flow control hydraulic cylinders, gates, and other portions of the portable storage unit.

One or more embodiments of the portable storage unit can include a lower ladder portion disposed on an exterior of the outer container and an upper ladder portion disposed on an exterior of the inner container. The upper ladder portion can be aligned with the lower ladder portion. A walkway can be disposed on a top of the inner container. As such, a user can access the top of the portable storage unit for inspection, maintenance, or any other reason.

Figure 2:
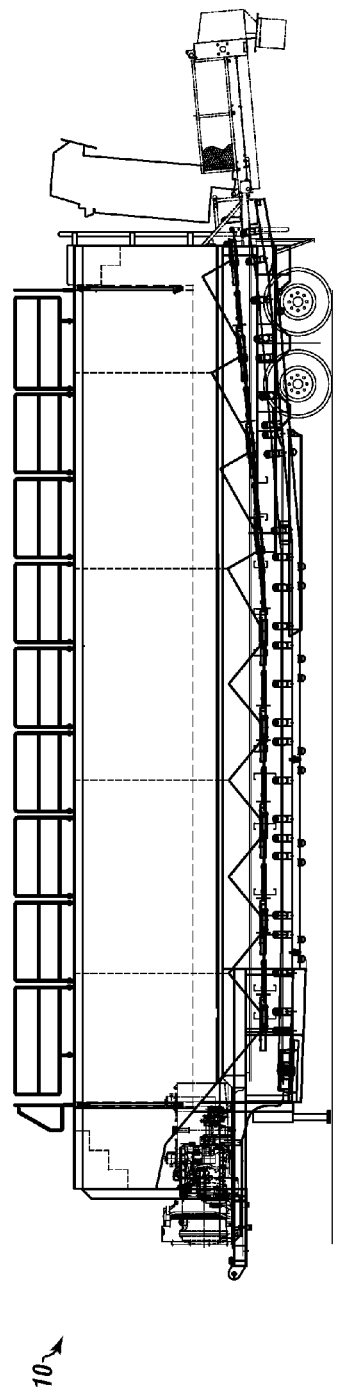
FIG. 2 depicts and embodiment of the portable storage unit in a lowered position.

Turning now to the Figures, FIG. 1 depicts an embodiment of a portable storage unit on a raised configuration. FIG. 2 depicts and embodiment of the portable storage unit in a lowered position.

Referring to FIGS. 1 and 2, the portable storage unit 10 can include a plurality of outer containers 18a, 18b, 18c, and 18d. Each outer container 18a-18d can be connected with the trailer 14, and can include a first storage cavity for receiving and storing the fluid particulates as detailed in FIG. 3.

The portable storage unit 10 can include a plurality of inner containers 26a, 26b, 26c, and 26d. The inner containers 26a-26d can be associated with the outer containers 18a-18d. For example, a first inner container 26a can be disposed within a first outer container 18a, and the first inner container 26a can move relative to the first outer container 18a.

In operation, the fluid particulate stored in the outer containers 18a-18d can flow from outlets of the outer containers 18a-18d onto a conveyor, which can be made up of the conveyor belt 34 and a plurality of conveyor belt rollers. The conveyor belt 34 can be connected with the trailer 14 and aligned with the outlets of the outer containers 18a-18d. The conveyor belt 34 can transmit the fluid particulates from the outer containers 18a-18d, such as for storage or disposal.

An end conveyor 36 can be connected with the trailer 14, the conveyor belt 34, or both. The end conveyor 36 can be aligned with the conveyor belt 34.

A down spout 38 can be connected with the end conveyor 36. In one or more embodiments, the end conveyor 36 can be configured to swivel for controlled positioning of the end conveyor 36 and down spout 38. As such, the end conveyor 36 can receive the fluid particulates from the conveyor belt 34 and can transmit the fluid particulates out through the down spout 38.

A hydraulic power system 40 can be connected to a frame of the trailer. The hydraulic power system 40 can be used to control the outer flow control hydraulic cylinders, inner flow control hydraulic cylinders, lifting hydraulic cylinders, and a drive 16 for the conveyor belt rollers.

The hydraulic power system 40 can include a hydraulic pump in communication with the outer flow control hydraulic cylinders, inner flow control hydraulic cylinders, lifting hydraulic cylinders, and a drive 16 for the conveyor belt rollers.

A deck engine 42 can drive the hydraulic power system 40.

A lower ladder portion 52 can be disposed on the exterior of at least one of the outer containers.

An upper ladder portion 54 can be disposed on an exterior of at least one of the inner containers. The upper ladder portion 54 can be aligned with the lower ladder portion 52.

Walkways 56a, 56b, 56c, and 56d can be disposed on the top of each of the inner containers 26a-26d. The walkways 56a-56d can be configured to be aligned, allowing a user to climb to the top of the portable storage unit 10 using the lower ladder portion 52 and upper ladder portion 54, and walk along the top of the portable storage unit 10 using the walkways 56a-56d.

A plurality of outriggers 27 can be connected to the trailer 14 for stabilizing a position of the trailer 14.

Figure 3:
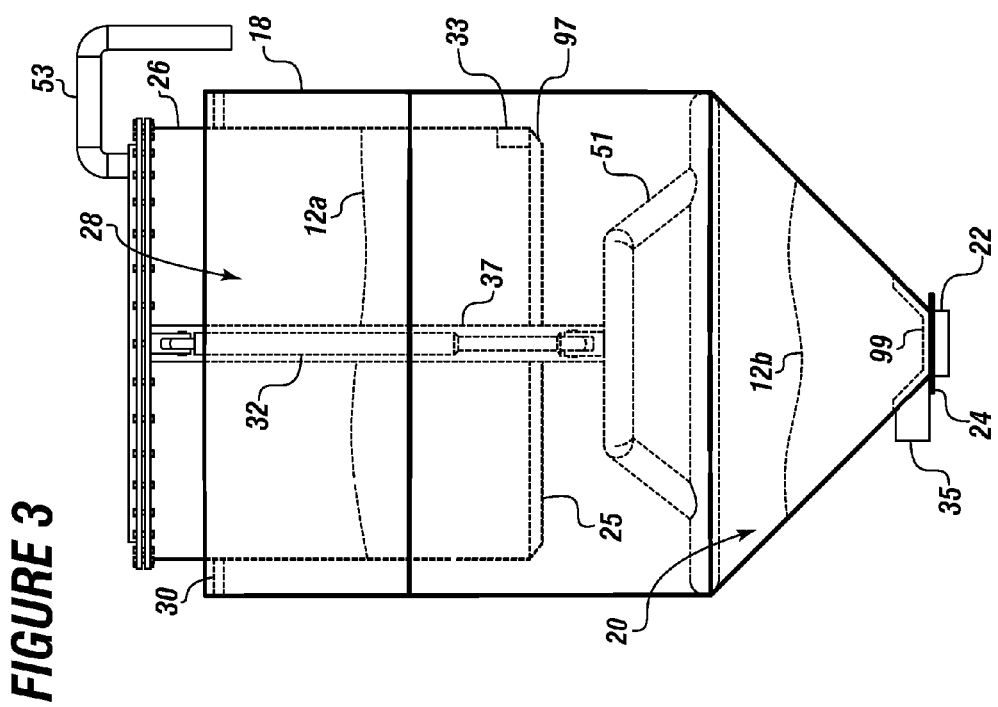
FIG. 3 depicts a detail of a container assembly.

FIG. 3 depicts a detail of a container assembly.

A lifting hydraulic cylinder 32 can be engaged between the inner container 26 and outer container 18. For example, the lifting hydraulic cylinder 32 can be engaged with an exterior portion of the inner container 26 and an interior portion of the outer container 18, such as an internal support 51 connected to the interior container 26 of the outer container 18. The lifting hydraulic cylinder 32 can be contained within a housing 37 to protect the lifting hydraulic cylinder 32 from contact with a second fluid particulate 12b.

Movement of the inner container 26 relative to the outer container 18 using the lifting hydraulic cylinder 32 can allow adjustment of a volumetric capacity of a first storage cavity 20 of the outer container 18. For example, as the inner container 26 is raised from the outer container 18 the volumetric capacity of the first storage cavity 20 can be increased, and as the inner container 26 is lowered into the outer container 18 the volumetric capacity of the first storage cavity 20 can be decreased.

At least a partial seal 30 can be formed between the inner container 26 and outer container 18. For example, the partial seal 30 can be a flap of flexible material configured to allow the inner container 26 to move relative to the outer container 18 while maintaining a sealed engagement between the inner container 26 and the outer container 18.

In operation, a loading assembly 53 can be used to fill a second storage cavity 28 of the inner container 26, a first storage cavity 20 of the outer container 18, or combinations thereof.

As such, the first fluid particulate 12a can be stored in the inner container 26 and the second fluid particulate 12b can be stored in the outer container 18. The first fluid particulate 12a and the second fluid particulate 12b can be the same or different.

The inner container 26 can have an inner container gate 97. The inner container gate 97 can be controlled by an inner flow control hydraulic cylinder 33. The inner container gate 97 can selectively open and close an inner container outlet 25 to provide selective fluid communication between the first storage cavity 20 and the second storage cavity 28; thereby allowing the first fluid particulate 12a to selectively flow into the first storage cavity 20.

The outer container 18 can have an outlet 22. The outlet 22 can be used to transmit the second fluid particulate 12b from within the first storage cavity 20. For example, the outer container 18 can have an outer container gate 24 for selectively opening and closing the outlet 22. The outer container gate 24 can be hydraulically controlled by an outer flow control hydraulic cylinder 35. As such, the second fluid particulate 12b can flow from the outer container 18.

In one or more embodiments, an insert 99 can be disposed in the outer container 18 proximate the outlet 22. The insert 99 can be configured to vibrate. For example, the insert 99 can vibrate due to air pressure, hydraulic pressure, or mechanical pressure. The insert 99 can be configured to prevent clumping or blockage of the second fluid particulate 12b in the outlet 22; thereby allowing the second fluid particulate 12b to flow from the outlet 22.

In one or more embodiments, the hydraulic power system can be used to control the outer flow control hydraulic cylinder 35, inner flow control hydraulic cylinder 33, and lifting hydraulic cylinder 32. For example, a hydraulic pump of the hydraulic power system can be in communication with the outer flow control hydraulic cylinder 35, inner flow control hydraulic cylinder 33, and lifting hydraulic cylinder 32.

While these embodiments have been described with emphasis on the embodiments, it should be understood that within the scope of the appended claims, the embodiments might be practiced other than as specifically described herein.

What is claimed is:

1. A portable storage unit for storing fluid particulates, the portable storage unit comprising:
   a container assembly comprising:
      an outer container;
      an inner container disposed within the outer container, wherein the inner container is configured to raise and lower relative to the outer container, the inner container comprises a bottom side and a top side opposite to each other, and the top side is above the bottom side in a raised position of the inner container and in a lowered position of the inner container; and
      at least a partial seal formed between the inner container and the outer container;
   a conveyor operatively aligned under an outlet of the outer container, and the outlet of the outer container is configured to be opened and closed by a gate;
   a trailer to which the container assembly is connected; and
   an end conveyor comprising a first end connected with at least one of the trailer or the conveyor, the end conveyor comprising a conveyor belt and rollers, and the first end of the end conveyor is horizontally aligned with the conveyor.

2. The portable storage unit of claim 1, further comprising a down spout connected with the end conveyor.

3. The portable storage unit of claim 1, wherein the end conveyor is configured to swivel relative to the conveyor.

4. The portable storage unit of claim 1, wherein the inner container has an inner container outlet, and the inner container outlet is configured to be opened and closed by a gate to provide selective fluid communication between a first storage cavity of the outer container and a second storage cavity of the inner container.

5. The portable storage unit of claim 1, wherein the container assembly comprises a lifting hydraulic cylinder operatively connected with the inner container and the outer container to raise and lower the inner container relative to the outer container.

6. The portable storage unit of claim 1, wherein the outer container has a volumetric capacity, raising the inner container increases the volumetric capacity of the outer container, and lowering the inner container decreases the volumetric capacity of the outer container.

7. The portable storage unit of claim 1, wherein the outer container comprises a bottom side and a top side opposite to each other, raising the inner container increases the distance between the bottom side of the outer container and the bottom side of the inner container and increases the distance between the bottom side of the outer container and the top side of the inner container, and lowering the inner container decreases the distance between the bottom side of the outer container and the bottom side of the inner container and decreases the distance between the bottom side of the outer container and the top side of the inner container.

8. The portable storage unit of claim 1, wherein the outer container comprises side walls, the inner container comprises side walls, and the side walls of the outer container are substantially parallel to the side walls of the inner container.

9. The portable storage unit of claim 8, wherein raising and lowering the inner container moves the inner container in a direction that is substantially parallel to the side walls.

10. A portable storage unit for storing fluid particulates, the portable storage unit comprises:
   a container assembly comprising:
      an outer container;
      an inner container disposed within the outer container, wherein the inner container is configured to raise and lower relative to the outer container, the inner container comprises a bottom side and a top side opposite to each other, and the top side is above the bottom side in a raised position of the inner container and in a lowered position of the inner container; and
      at least a partial seal formed between the inner container and the outer container;
   the portable storage unit further comprising:
   a. at least one lower ladder portion disposed on an exterior surface of the outer container;
   b. at least one upper ladder portion disposed on an exterior surface of the inner container, wherein each upper ladder portion is aligned with one of the lower ladder portions; and
   c. a walkway disposed on a top surface of the inner container.

11. A portable storage unit for storing fluid particulates, wherein the portable storage unit comprises:
   a. a trailer;
   b. a plurality of container assemblies connected with the trailer, wherein each container assembly comprises:
      (i) an outer container comprising an outer container outlet;
      (ii) an inner container disposed within the outer container, wherein the inner container is configured to raise and lower relative to the outer container, the inner container comprises a bottom side and a top side opposite to each other, and the top side is above the bottom side in a raised position of the inner container and in a lowered position of the inner container; and
      (iii) at least a partial seal formed between the inner container and the outer container;
   c. a conveyor operatively aligned with each outer container outlet, wherein the conveyor comprises a conveyor belt driven by a plurality of rollers, and wherein the conveyor is connected with the trailer; and
   d. an end conveyor comprising a first end connected with at least one of the trailer or the conveyor, the end conveyor comprising a conveyor belt and rollers, and the first end of the end conveyor is horizontally aligned with the conveyor.

12. The portable storage unit of claim 11, further comprising a down spout connected to the end conveyor.

13. The portable storage unit of claim 11, wherein the end conveyor is configured to swivel relative to the conveyor.

14. A portable storage unit for storing fluid particulates, the portable storage unit comprises:
   a container assembly comprising:
      an outer container;
      an inner container disposed within the outer container, wherein the inner container is configured to raise and lower relative to the outer container, the inner container comprises a bottom side and a top side opposite to each other, and the top side is above the bottom side in a raised position of the inner container and in a lowered position of the inner container; and
      at least a partial seal formed between the inner container and the outer container, wherein the seal is formed by a flap of flexible material connected to an outer surface of the inner container and an inner surface of the outer container.

15. A portable storage unit for storing fluid particulates, the portable storage unit comprises:

a container assembly comprising:
  an outer container;
  an inner container disposed within the outer container, wherein the inner container is configured to raise and lower relative to the outer container, the inner container comprises a bottom side and a top side opposite to each other, and the top side is above the bottom side in a raised position of the inner container and in a lowered position of the inner container; and
  at least a partial seal formed between the inner container and the outer container;
at least one lower ladder portion disposed on an exterior surface of the outer container;
at least one upper ladder portion disposed on an exterior surface of the inner container, wherein each upper ladder portion is aligned with one of the lower ladder portions; and
a walkway disposed on a top surface of the inner container, wherein the top surface of the inner container that comprises the walkway is above the at least one upper ladder portion when the inner container is in the raised position.

\* \* \* \* \*